(12) United States Patent
Wang et al.

(10) Patent No.: US 11,205,906 B2
(45) Date of Patent: Dec. 21, 2021

(54) CHARGING PROCESSING METHOD, TERMINAL DEVICE AND STORAGE MEDIUM

(71) Applicant: Beijing Xiaomi Mobile Software Co., Ltd., Beijing (CN)

(72) Inventors: Yanteng Wang, Beijing (CN); Ning Hao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 141 days.

(21) Appl. No.: 16/548,300

(22) Filed: Aug. 22, 2019

(65) Prior Publication Data

US 2020/0067336 A1  Feb. 27, 2020

(30) Foreign Application Priority Data

Aug. 22, 2018 (CN) .......................... 201810963209.6

(51) Int. Cl.
*H02J 7/00* (2006.01)

(52) U.S. Cl.
CPC ............... *H02J 7/0034* (2013.01); *H02J 7/00* (2013.01); *H02J 2207/40* (2020.01)

(58) Field of Classification Search
CPC ......... H02J 7/00; H02J 7/0034; H02J 2207/40
See application file for complete search history.

(56) References Cited

U.S. PATENT DOCUMENTS

| | | | |
|---|---|---|---|
| 9,778,293 B1 * | 10/2017 | Klein | ................. G01R 19/1659 |
| 2015/0002077 A1 | 1/2015 | Wang | |
| 2016/0349292 A1 | 12/2016 | Atkinson | |
| 2017/0364114 A1 * | 12/2017 | Sporck | ................ G06F 13/4295 |
| 2018/0097385 A1 | 4/2018 | Li | |

FOREIGN PATENT DOCUMENTS

| | | |
|---|---|---|
| CN | 106356918 A | 1/2017 |
| CN | 106549459 A | 3/2017 |
| CN | 206041164 U | 3/2017 |

(Continued)

OTHER PUBLICATIONS

Extended European Search Report dated Apr. 8, 2020 in European Patent Application No. 19192900.9, citing document AO therein, 13 pages.

(Continued)

*Primary Examiner* — Robert Grant
(74) *Attorney, Agent, or Firm* — Oblon, McClelland, Maier & Neustadt, L.L.P.

(57) ABSTRACT

The present disclosure relates to a charging processing method, a terminal device and a storage medium. The charging processing method, applied to a terminal device, includes determining whether the terminal device is in a upstream facing port (UFP) mode; when the terminal device is in the UFP mode, determining whether a cable is connected to the terminal device; when the cable is connected to the terminal device, determining whether the cable is a standard cable or a non-standard cable, wherein the terminal device is connected to a charging device via the cable; and when the cable is the non-standard cable, controlling, via the cable, the charging device to provide a standard voltage of non-quickly-charging input voltage to charge the terminal device.

17 Claims, 13 Drawing Sheets

(56) References Cited

FOREIGN PATENT DOCUMENTS

CN         106711646 A    5/2017
KR    10-2014-0092547 A   7/2014

OTHER PUBLICATIONS

The partial European Search Report dated Nov. 28, 2019 in Patent Application 19192900.9, citing documents AA, AB, AO and AX therein, 14 pages.
"Universal Serial Bus Interfaces for Data and Power—Part 1-3: Common Components—USB Type-C™ Cable and Connector Specification" International Electrotechnical Commission, IEC 62680-1-3, XP082013853, May 24, 2018, pp. 1-259 and cover pages.
Combined Chinese Office Action and Search Report dated Feb. 24, 2021 in Chinese Patent Application No. 201810963209.6 (with English translation of Categories of Cited Documents), citing documents AA and AO-AQ therein, 9 pages.
Chinese Office Action dated Aug. 25, 2021, issued in Chinese Patent Application No. 201810963209.6 (with English translation).
Xicai, He. "Design and Application of Stabalized Power Supply Circuit." China Electric Power Press. Feb. 28, 2006.

* cited by examiner

CHARGING PROCESSING METHOD, TERMINAL DEVICE AND STORAGE MEDIUM

CROSS-REFERENCE TO RELATED APPLICATIONS

This application is based upon and claims priority to Chinese Patent Application No. 201810963209.6, filed on Aug. 22, 2018, the entire contents of which are incorporated herein by reference.

TECHNICAL FIELD

The present disclosure relates to the field of terminal technology, and more particularly to a charging processing method, a terminal device and a storage medium.

BACKGROUND

With the development of technology of smart terminal devices, terminal devices have become important tools in people's lives and work. A terminal device needs to be charged, and is generally provided with a charging line and a charger, wherein the two ends of the charging line are respectively connected to a charging interface of the terminal device and the charger, the charger is connected to a power source, and then the charger charges the terminal device via the charging line.

A C to A cable may be provided for a terminal device. The C to A cable is a wire conforming to Universal Serial Bus Implementers Forum (USB IF) specification. One end of such wire is a type A plug interface, the other end is a type C plug interface, wherein the type A plug interface is for connecting to a charger, and the type C plug interface is for connecting to the charging interface of a terminal device. C to A cables may include standard cables and non-standard cables, wherein the size of a resistor in the standard cables is 56K, the size of a resistor in the non-standard cable is smaller than that in the standard cable, and the size of the resistor in the non-standard cable may be 10K, 22K or OK. When the terminal device is being charged, the VBUS capacitor in the charging interface of the terminal device is connected to the C to A cable, and the type C plug interface of the C to A cable is connected to the CC pin in the charging interface of the terminal device, thus the voltage of the VBUS capacitor can be transmitted to the CC pin in the charging interface. However, if a non-standard cable is used to connect the terminal device to charge the terminal device, and the charger connected to the terminal device adopts the quickly-charging protocol to charge the terminal device, the voltage of the VBUS capacitor in the charging interface of the terminal device may be higher than that generated by the non-quickly-charging mode, which may damage the CC pin in the charging interface, thereby damaging the terminal device.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a charging processing method applied to a terminal device. The method includes determining whether the terminal device is in a upstream facing port (UFP) mode; when the terminal device is in the UFP mode, determining whether a cable is connected to the terminal device; when the cable is connected to the terminal device, determining whether the cable is a standard cable or a non-standard cable, wherein the terminal device is connected to a charging device via the cable; and when the cable is the non-standard cable, controlling, via the cable, the charging device to provide a standard voltage of non-quickly-charging input voltage to charge the terminal device.

According to an aspect, the method further includes, when the cable is the standard cable, controlling, via the cable, the charging device to provide a quickly-charging input voltage to charge the terminal device.

According to another aspect, the method further includes, when the cable is the non-standard cable, displaying an alert message that is configured to indicate that the cable is the non-standard cable.

In an example, when determining whether the cable connected to the terminal device is the standard cable or the non-standard cable, the method further includes switching a CC pin of the terminal device connected to a first resistor of a C interface of the cable to an ADC module in the terminal device by a preset frequency; when the CC pin is connected to the ADC module, triggering the ADC module to acquire a first voltage value provided via the cable through a second resistor of the terminal device; and determining whether the cable is the standard cable or the non-standard cable based on the first voltage value.

In another example, when determining whether the cable is the standard cable or the non-standard cable based on the first voltage value, the method further includes determining whether the first voltage value exceeds a preset voltage threshold; when the first voltage value exceeds the preset voltage threshold, increasing a number of times that the first voltage value exceeds the preset voltage threshold by one; determining an accumulated number of times that the first voltage value exceeds the preset voltage threshold; and when the accumulated number of times that the first voltage value exceeds the preset voltage threshold is greater than or equal to a preset number of times, determining that the cable is the non-standard cable.

According to an aspect, the method further includes, when the accumulated number of times that the first voltage value exceeds the preset voltage threshold is less than the preset number of times, determining that the cable is the standard cable.

In an example, when controlling, via the cable, the charging device to provide the quickly-charging input voltage to charge the terminal device, the method further includes adopting a quickly-charging protocol to control the charging device to boost a voltage output by the charging device via the cable to charge the terminal device by adopting the quickly-charging input voltage.

In another example, when determining whether the terminal device is in the UFP mode, the method further includes determining whether a CC pin of the terminal device is pulled down to a first resistor of a C interface of the cable; and when the CC pin of the terminal device is pulled down to the first resistor of the C interface of the cable, determining that the terminal device is in the UFP mode.

According to an aspect, the method further includes determining whether the CC pin of the terminal device is pulled up to a current source of the terminal device; and when the CC pin is pulled up to the current source of the terminal device, determining that the terminal device is in a downstream facing port (DFP) mode.

Aspects of the disclosure also provide a terminal device. The terminal device includes a processor and a memory configured to store instructions executable by the processor. The processor is configured to determine whether the terminal device is in a upstream facing port (UFP) mode; when the terminal device is in the UFP mode, determine whether a cable is connected to the terminal device; when the cable is connected to the terminal device, determine whether the cable is a standard cable or a non-standard cable, wherein the terminal device is connected to a charging device via the cable; and when the cable is the non-standard cable, control, via the cable, the charging device to provide a standard voltage of non-quickly-charging input voltage to charge the terminal device.

Aspects of the disclosure also provide a non-transitory computer-readable medium storing instructions that, when executed by one or more processors of a terminal device, cause the terminal device to determine whether the terminal device is in a upstream facing port (UFP) mode; when the terminal device is in the UFP mode, determine whether a cable is connected to the terminal device; when the cable is connected to the terminal device, determine whether the cable is a standard cable or a non-standard cable, wherein the terminal device is connected to a charging device via the cable; and when the cable is the non-standard cable, control, via the cable, the charging device to provide a standard voltage of non-quickly-charging input voltage to charge the terminal device.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure, and together with the description, serve to explain the principles of the present disclosure.

Figure 1:
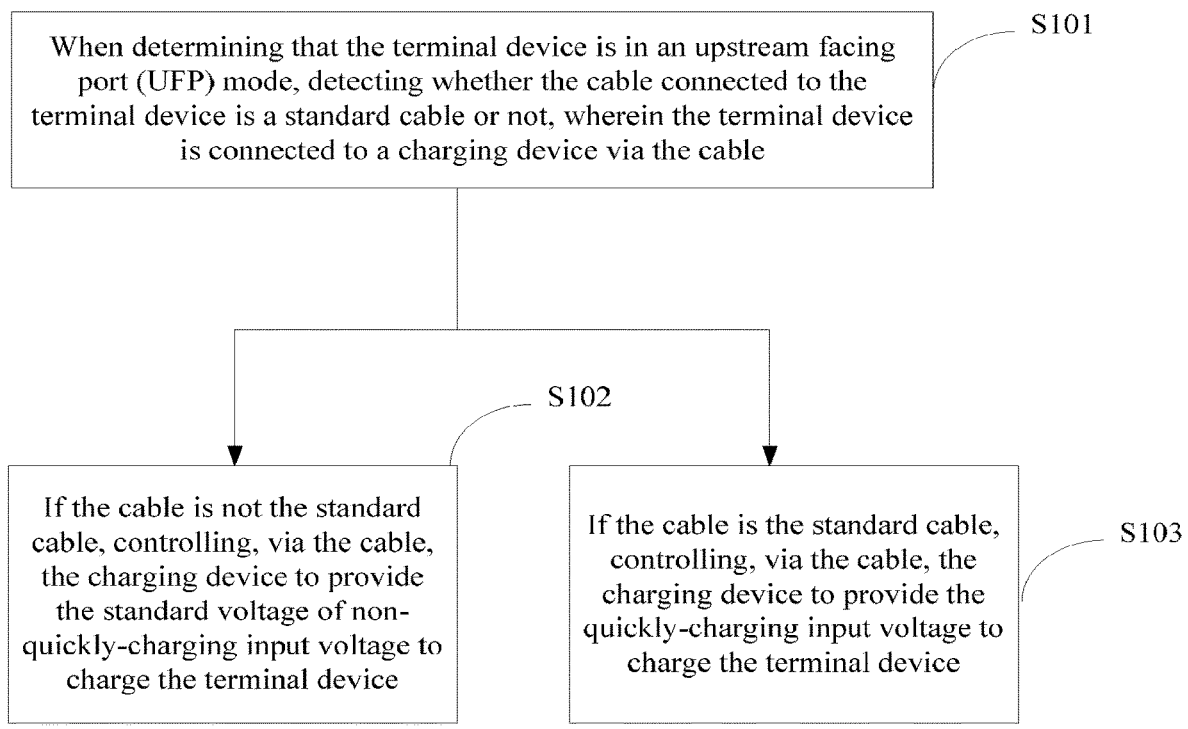
FIG. 1 is a flowchart of first aspect of a charging processing method according to an exemplary aspect of the present disclosure.

Reference numerals: 61—first CC pin; 62—second CC pin; 64—first resistance; and 65—second resistance.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

FIG. 1 is a flowchart of first aspect of a charging processing method according to an exemplary aspect. As shown in FIG. 1, the charging processing method provided in the aspect may be applied to a terminal device, that is, a terminal device such as a mobile phone or a tablet computer, etc., and the charging processing method specifically includes following steps S101-S103.

In step S101, when determining that the terminal device is in an upstream facing port (UFP) mode, detecting whether the cable connected to the terminal device is a standard cable or not, wherein the terminal device is connected to a charging device via the cable.

In this step, under normal circumstances, movable terminal devices such as mobile phones and tablet computers, etc., are in a dual role port (DRP) mode, that is, may be in a working discharging state, therefore, during the charging processing, it is first necessary to determine whether the terminal device is in the UFP mode or not, that is, whether the terminal device is in a power-absorbing mode or not. After determining that the terminal device is in the UFP mode, the terminal device will detect whether the cable connected to the terminal device for charging is the standard cable or not.

In step S102, if the cable is not the standard cable, controlling, via the cable, the charging device to provide the standard voltage of non-quickly-charging input voltage to charge the terminal device.

In this step, if it is detected that the cable connected to the terminal device is not the standard cable, that is to say, during the quickly-charging process, the power source (charging device) may output a relatively large voltage to the terminal device via the cable. Resistance of the resistor in a non-standard cable is relatively small, therefore, if the quickly-charging protocol is still adopted to quickly-charge the terminal device at this time, the voltage in the charging interface of the terminal device may be much higher than the standard voltage for charging, which may easily damage the charging interface of the terminal device, therefore, after it is determined that the cable connected to the terminal device is not the standard cable, the terminal device needs to control the charging device to charge the terminal device by adopting the standard voltage via the connected cable.

Another specific implementation manner is that: if the cable is the standard cable, the terminal device adopts the quickly-charging protocol to control the charging device to boost the voltage output by the charging device via the cable, to charge the terminal device by adopting the quickly-charging input voltage.

In step S103, if the cable is the standard cable, controlling, via the cable, the charging device to provide the quickly-charging input voltage to charge the terminal device.

In this step, if it is determined that the cable connected to the terminal device is the standard cable, the resistance of the resistor in the cable is relatively large. Therefore, even if the charging device connected to the terminal device adopts the quickly-charging protocol to provide a larger voltage, the resistor in the cable may undertake a relatively large voltage, which may not lead the charging interface of the terminal device to be burnt out. Therefore, after it is determined that the cable is the standard cable, the charging device such as a charger or a power adapter, etc., may be controlled via the cable to provide the quickly-charging input voltage to charge the terminal device.

The charging processing method provided by the aspects of the present disclosure, when determining to charge the terminal device, may detect whether the connected cable is the standard cable or not. When it is determined that the cable is the standard cable, the method controls the charging device to be quickly-charged. When it is determined that the connected cable is a non-standard cable, the method does not adopt the quickly-charging protocol for charging, but control the charging device to adopt the standard voltage to charge the terminal device, so as to prevent the charging interface of the terminal device from being damaged.

Figure 2:
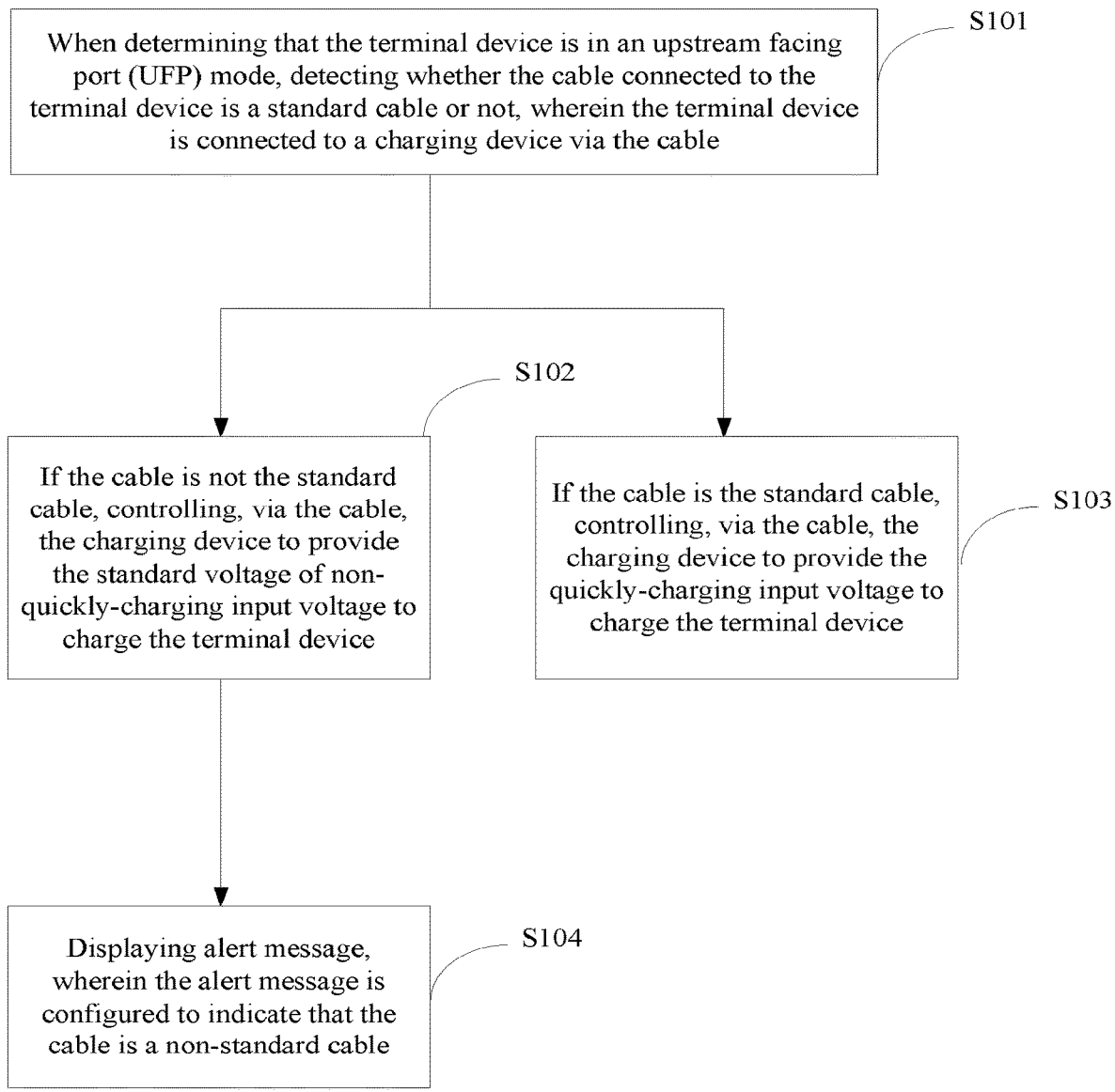
FIG. 2 is a flowchart of second aspect of a charging processing method according to an exemplary aspect of the present disclosure.

FIG. 2 is a flowchart of second aspect of a charging processing method according to an exemplary aspect. As shown in FIG. 2, on the basis of foregoing aspects, the charging processing method provided by the aspects of the present disclosure further includes following step S104.

In step S104, displaying alert message, wherein the alert message is configured to indicate that the cable is a non-standard cable.

In this step, after determining that the cable connected to the terminal device for charging is a non-standard cable, the user may be prompted by the alert message that the cable is the non-standard cable. Specifically, the alert message may be text message, voice message, image message, or video message, etc., which is not limited in the disclosure, and may be set according to actual needs.

For example, text message "Current C to A cable is a non-standard cable" may be generated, and then the text message "Current C to A cable is a non-standard cable" is displayed on the screen of the terminal device.

In a specific implementation, the alert message may be displayed on the interface of the terminal device, so that the user knows that the cable is a non-standard cable and replaces it as soon as possible, so as to ensure the security of the device.

Figure 3:
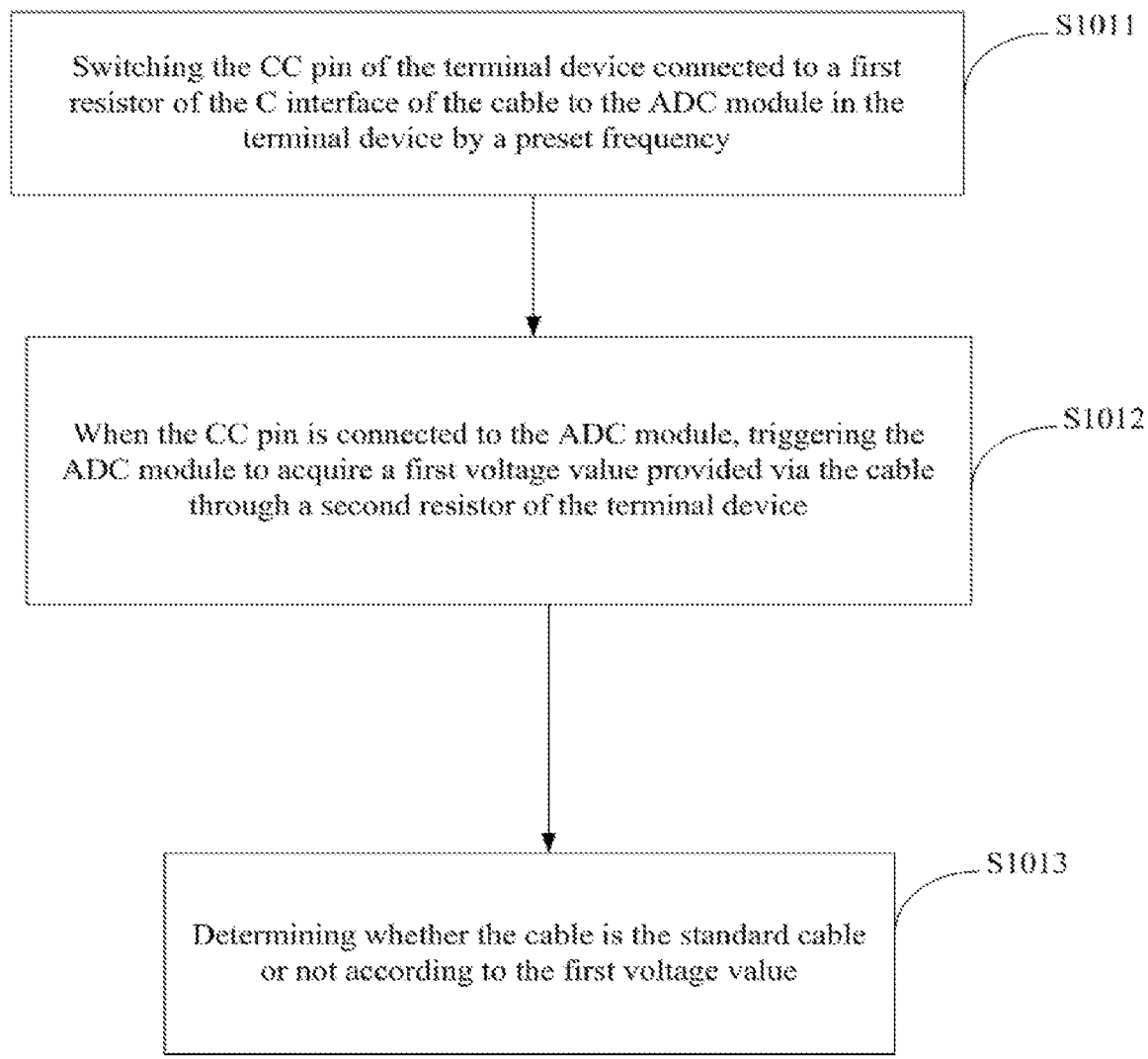
FIG. 3 is a flowchart of third aspect of a charging processing method according to an exemplary aspect of the present disclosure.

FIG. 3 is a flowchart of third aspect of a charging processing method according to an exemplary aspect. As is shown in FIG. 3, on the basis of any of the aspects above, it is required to detect whether the cable connected to the terminal device is the standard cable or not. In a specific implementation manner, the cable detection process includes following steps S1011-S1013.

In step S1011, switching the CC pin of the terminal device connected to a first resistor of the C interface of the cable to the ADC module (shown as the block at lower left most in FIG. 5) in the terminal device by a preset frequency.

Figure 5:
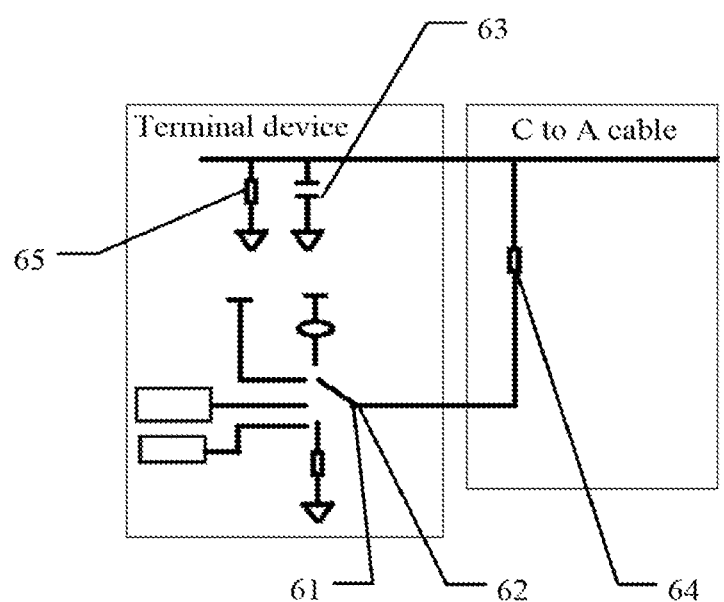
FIG. 5 is a circuit schematic diagram of an example of a charging processing method according to an exemplary aspect of the present disclosure.

In this aspect, FIG. 5 is a circuit schematic diagram of an example of a charging processing method according to an exemplary aspect. As is shown in FIG. 5, according to the schematic diagram shown in FIG. 5, a specific scheme for determining that the terminal device is in the upstream facing port (UFP) mode may be: if it is determined that the CC pin is pulled down to the first resistor 64 of the C interface of the cable, it is determined that the terminal device is in the UFP mode. Otherwise, the terminal device is in the DRP mode.

A first CC pin 61 in the charging interface of the terminal device and the first resistor 64 in the C interface of the cable are controlled to be disconnected by the preset frequency, wherein the first CC pin 61 is connected to the second CC pin 62 of the cable C to A cable to be detected, which is able to make the CC pin (the second CC pin 62) of the C interface connected with the first resistor to be connected to or disconnected from an analog-to-digital converter (ADC) of the terminal device.

In type C specification, the current source (shown as the ellipse in FIG. 5) in the terminal device includes three levels of 330 μA, 180 μA and 80 μA. When the terminal device is at the level of 330 ρA, it indicates that the terminal device has 3 A power supply capability. When the terminal device is at the level of 180 μA, it indicates that the terminal device has 1.5 A power supply capability. When the terminal device is in the 80 μA level, it indicates that the terminal device has 500 mA or 900 mA power supply capability. The terminal device has the first CC pin 61. When the first CC pin 61 is connected to the Ip end of the terminal device, it indicates that the terminal device is in a source mode; and when the first CC pin 61 of the terminal device is connected to the Rd end of the terminal device, it indicates that the device is in a sink mode, which are not described in details here.

Specifically, the charging interface of the terminal device has the first CC pin 61, the C interface of the cable has a first resistor 64, and the first CC pin 61 is connected to the second CC pin 62 of the cable (C to A cable) to be detected; and there is a VBUS capacitor 63 in the charging interface. The terminal device disconnects the first CC pin 61 from the first resistor 64 by the preset frequency, for example, the terminal device disconnects the first CC pin 61 from the first resistor 64 after connecting the first CC pin 61 to the first resistor 64, and repeats this operation a plurality of times, for example, 10 times.

In step S1012, when the CC pin is connected to the ADC module, triggering the ADC module to acquire a first voltage value provided via the cable through a second resistor of the terminal device.

In this step, each time the first CC pin 61 and the ADC module of the terminal device are connected (or when the first CC pin 61 is disconnected from the first resistor 64), detecting the voltage on the VBUS capacitor 63 connected to the cable, that is, the first voltage value described above.

In step S1013, determining whether the cable is the standard cable or not according to the first voltage value.

A specific manner of determining whether the cable is the standard cable or not through the detected first voltage value is: presetting a voltage threshold according to experience first, then, each time after detecting the first voltage value, comparing the first voltage value with the set voltage threshold.

Figure 4:
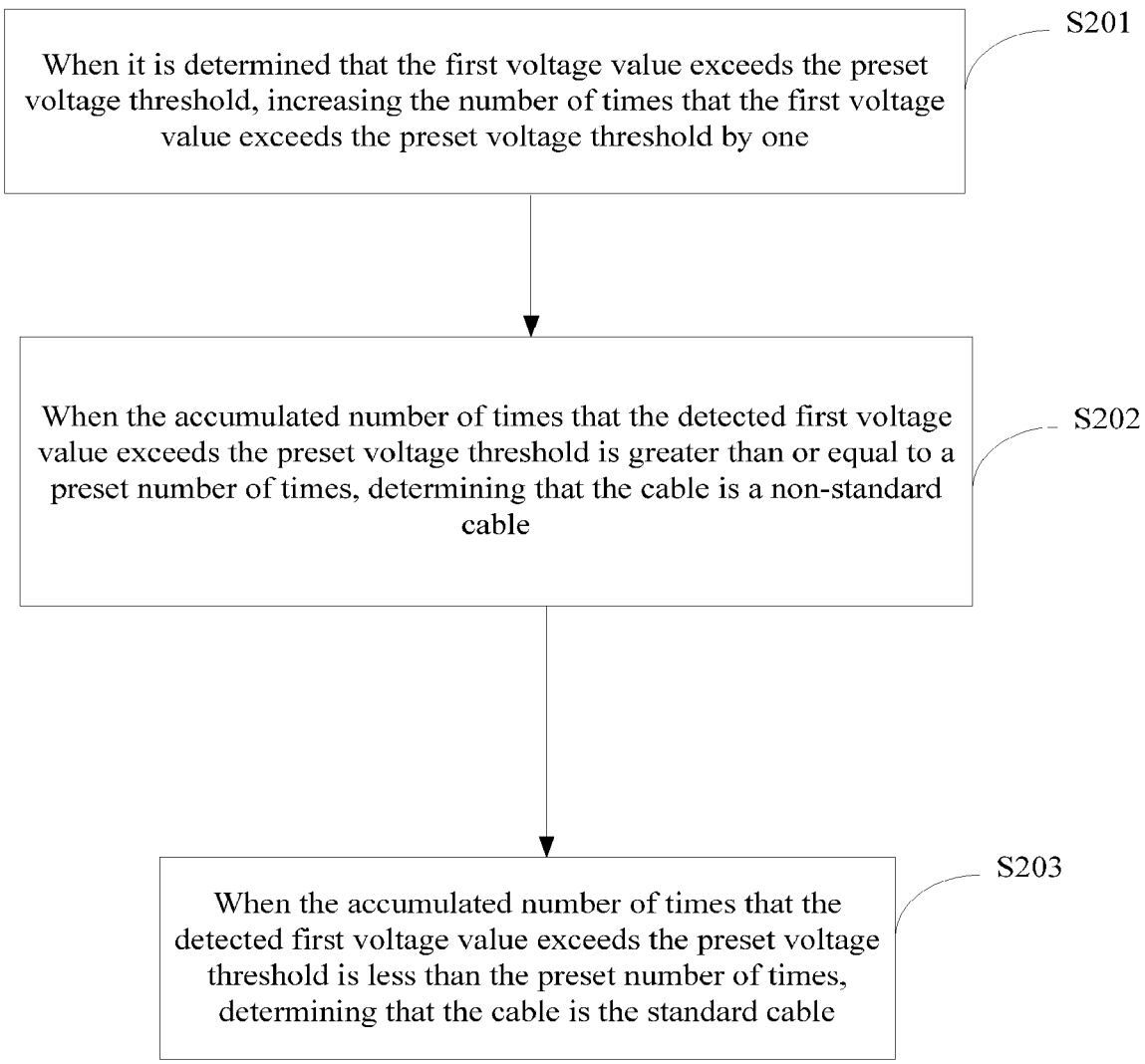
FIG. 4 is a flowchart of fourth aspect of a charging processing method according to an exemplary aspect of the present disclosure.

FIG. 4 is a flowchart of fourth aspect of a charging processing method according to an exemplary aspect. The charging processing method provided in the aspect may be applied to a terminal device. The terminal device includes a mobile terminal, a personal terminal, and the like, such as a touchscreen mobile phone, a tablet computer, a personal computer, etc., which is not limited in the present solution. As shown in FIG. 4, specific implementation steps S201-S203 of the step S1013 are as follows.

In step S201, when it is determined that the first voltage value exceeds the preset voltage threshold, increasing the number of times that the first voltage value exceeds the preset voltage threshold by one.

In step S202, when the accumulated number of times that the detected first voltage value exceeds the preset voltage threshold is greater than or equal to a preset number of times, determining that the cable is a non-standard cable.

In step S203, when the accumulated number of times that the detected first voltage value exceeds the preset voltage threshold is less than the preset number of times, determining that the cable is the standard cable.

In the these steps, it may be known that, in the process of determining whether the cable is the standard cable or not according to the first voltage value, the determination may be performed according to a plurality of measurement results, that is, each time the CC pin (first CC pin 61) is connected to the ADC module, the first voltage value is detected, the first voltage value is compared with the voltage threshold, and when the first voltage value is greater than the voltage threshold, it is recorded, then, by the preset frequency, the first voltage value is continuously collected and compared with the voltage threshold, till the accumulated number of times that the detected first voltage value exceeds the preset voltage threshold reaches the preset number of times, then it is determined that the cable is a non-standard cable, or, if after a plurality of times of measurement, the first voltage value keeps being less than the voltage threshold almost at all times, or only one large voltage occurs occasionally that may be caused by a surge or other interference, it is determined that the cable is the standard cable, that is, the plurality of times of measurement may ensure accuracy of the detection result.

On the basis of the schematic diagram shown in FIG. 5, a specific implementation manner of the technical solution of the aspect is that: the terminal device determines whether the voltage on the VBUS capacitor 63 connected to the C to A cable is greater than the preset voltage threshold or not when the first CC pin 61 is disconnected from the first resistor 64, and if it is greater, the number of times whose preset value is 0 is added by one. The above determination process is performed each time when the first CC pin 61 and the first resistor 64 are disconnected, so as to obtain a value of number of times. The terminal device determines whether the number of times is greater than or equal to a preset threshold of number of times or not, for example, the preset threshold of number of times may adopt 3; then, when the terminal device determines that the number of times is greater than or equal to the preset threshold of number of times, the terminal device may determine that the C to A cable to be detected is a non-standard cable. Furthermore, the terminal device needs to control the charger to output current with 5V voltage, that is, control the charger connected to the current non-standard cable not to boost voltage.

In the aspect, the first CC pin 61 in the charging interface of the terminal device and the first resistor 64 in the C interface of the cable is controlled to be disconnected by the preset frequency, wherein the first CC pin 61 is connected to the second CC pin 62 of the cable C to A cable to be detected. Each time of the disconnection, the voltage on the VBUS capacitor 63 connected to the C to A cable is detected, wherein the VBUS capacitor 63 is located in the charging interface. The number of times that the detected first voltage value exceeds the preset voltage threshold is determined. When it is determined that the number of times is greater than or equal to the preset threshold of number of times, it is determined that the C to A cable is a non-standard cable, and the charger connected via the non-standard cable is controlled not to boost voltage. Therefore, the present disclosure provides a method for detecting whether the C to A cable is a non-standard cable or not, in which, the first CC pin 61 in the charging interface of the terminal device and the first resistor 64 in the C interface of the cable is disconnected by the preset frequency, then, the voltage on the VBUS capacitor 63 connected to the C to A cable is detected. When it is determined that the number of times that the detected first voltage value exceeds the preset voltage threshold is too much, it may be determined that the C to A cable to be detected is a non-standard cable, and the charger connected via the current non-standard cable is controlled not to boost voltage. Further, when it is determined that the C to A cable is a non-standard cable, the terminal device may be charged without adopting the quickly-charging protocol, thereby protecting the terminal device and protecting the CC pin in the charging interface.

In specific implementation of any of the above solutions, the terminal device controls the first CC pin 61 to be connected to the current source in the charging interface, so that after the terminal device enters the downstream facing port (DFP) mode, the current source charges the VBUS capacitor 63 and the second resistor 65 via the cable, wherein the second resistor 65 is located in the charging interface, and the second resistor 65 is connected in parallel with the VBUS capacitor 63.

That is to say, before detecting the C to A cable to be detected, it needs to connect the first CC pin 61 to the current source in the charging interface. At this time, the terminal device enters the DFP mode, that is, enters the source mode. At this time, the current source may charge the VBUS capacitor 63 and the second resistor 65 through the C to A cable, thereby realizing the purpose of charging the VBUS capacitor 63 and the second resistor 65.

Next, the first CC pin 61 in the charging interface of the terminal device and the first resistor 64 in the C interface of the cable are controlled to be disconnected by the preset frequency, wherein the first CC pin 61 is connected to the second CC pin 62 of the cable C to A cable to be detected. Each time of disconnection, the first voltage value on the VBUS capacitor 63 connected to the C to A cable is detected, and then it is determined whether the cable is the standard cable or not according to the determination manner in the above solutions.

After determining that the cable is a non-standard cable, the terminal device may obtain charging protocol information of the charger connected to the terminal device, wherein the charging protocol information indicates whether the current charger is a charger that adopts the quickly-charging protocol or not; then, the terminal device may determine, according to the obtained charging protocol information, whether the charger currently connected to the terminal device is a charger that adopts the quickly-charging protocol or not. When determining that the charger currently connected to the terminal device is a charger adopting the quickly-charging protocol, the terminal device needs to control the charger not to adopt the quickly-charging protocol to boost voltage, and then the terminal device controls the charger to output a current that conforms to the standard voltage, wherein the standard voltage is less than the second voltage of the current generated by the charger after boosting voltage by adopting the quickly-charging protocol. Therefore, when the terminal device determines that the charger is a charger adopting the quickly-charging protocol, and determines that the cable is a non-standard cable, the terminal device controls the charger to output a current of 5V voltage, that is, controls the charger not to boost voltage, thereby ensuring that the current of low voltage does not damage the charging interface and the terminal device.

If it is determined that the cable is the standard cable, since the C to A cable to be detected is the standard cable, when the terminal device is charged, after the voltage of the VBUS capacitor 63 is transmitted to the charging interface, the charging interface may withstand the current voltage, so that the charging interface and the terminal may not be damaged.

In the charging processing schemes provided by the aspects of the present disclosure, when it is determined that the C to A cable to be detected is a non-standard cable, the charger connected to the current non-standard cable is controlled not to boost voltage; that is to say, when it is determined that the C to A cable is a non-standard cable, the terminal may be charged without adopting the quickly-charging protocol, thereby protecting the terminal and protecting the CC pin in the charging interface. Moreover, after it is determined that the C to A cable is a non-standard cable or the standard cable, alert information is generated, so that the type of the current C to A cable may be learnt by a user.

Figure 6:
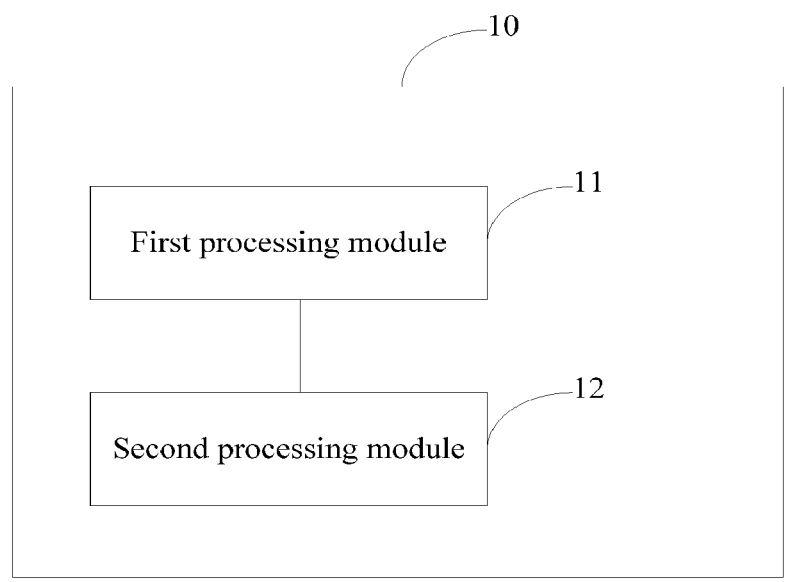
FIG. 6 is a block diagram of first aspect of a terminal device according to an exemplary aspect of the present disclosure.

FIG. 6 is a block diagram of first aspect of a terminal device according to an exemplary aspect. Referring to FIG. 6, the terminal device 10 includes:

a first processing module 11, configured to, when determining that the terminal device is in a upstream facing port (UFP) mode, detect whether the cable connected to the terminal device is the standard cable or not, wherein the terminal device is connected to a charging device via the cable; and a second processing module 12, configured to, if the cable is not the standard cable, control, via the cable, the charging device to provide the standard voltage of non-quickly-charging input voltage to charge the terminal device.

The terminal device provided by the aspect of the present disclosure is configured to implement the technical solution in any of the foregoing method aspects, and their implementation principle and the technical effect are similar. That is, when determining to charge the terminal device, it may detect whether the connected cable is the standard cable or not. When determining that the connected cable is a non-standard cable, it does not adopt the quickly-charging protocol for charging, but control the charging device to adopt the standard voltage to charge the terminal device, so as to prevent the terminal device and the charging interface from being damaged.

Figure 7:
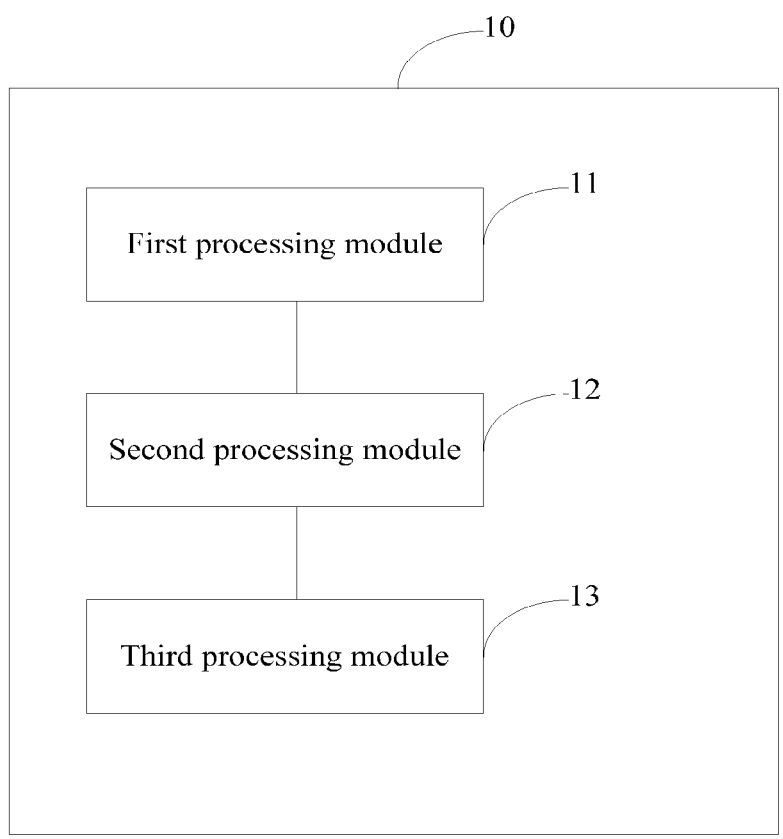
FIG. 7 is a block diagram of second aspect of a terminal device according to an exemplary aspect of the present disclosure.

FIG. 7 is a block diagram of second aspect of a terminal device according to an exemplary aspect. As shown in FIG. 7, on the basis of the aspect shown in FIG. 6, the terminal device 10 further includes:

a third processing module 13, configured to, if the cable is the standard cable, control, via the cable, the charging device to provide the quickly-charging input voltage to charge the terminal device.

Figure 8:
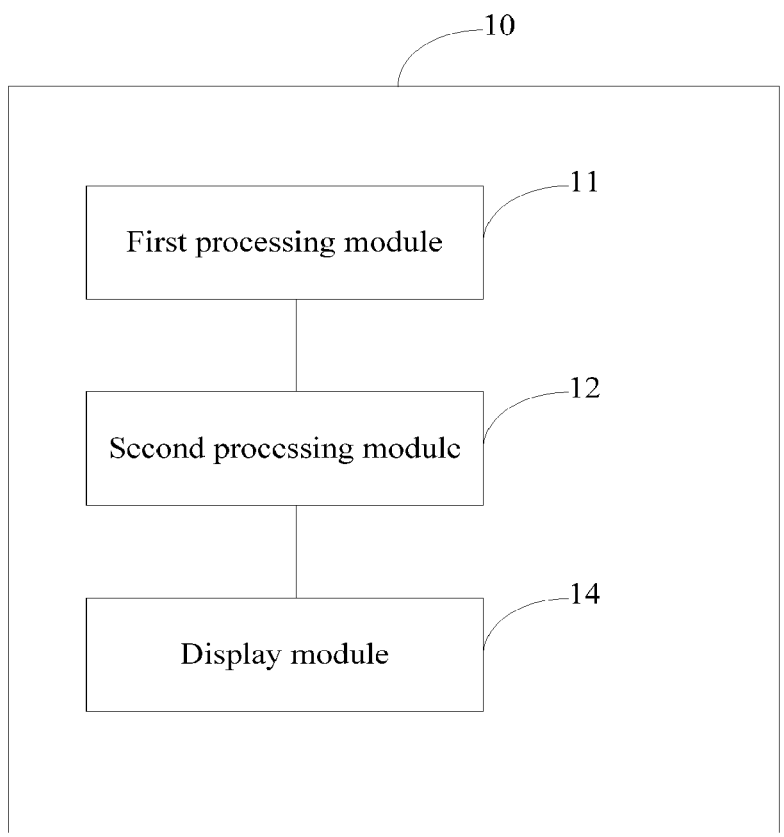
FIG. 8 is a block diagram of third aspect of a terminal device according to an exemplary aspect of the present disclosure.

FIG. 8 is a block diagram of third aspect of a terminal device according to an exemplary aspect. As shown in FIG. 8, on the basis of the aspect shown in FIG. 6, the terminal device 10 further includes:

a display module 14, configured to display alert message, wherein the alert message is configured to indicate that the cable is a non-standard cable.

Figure 9:
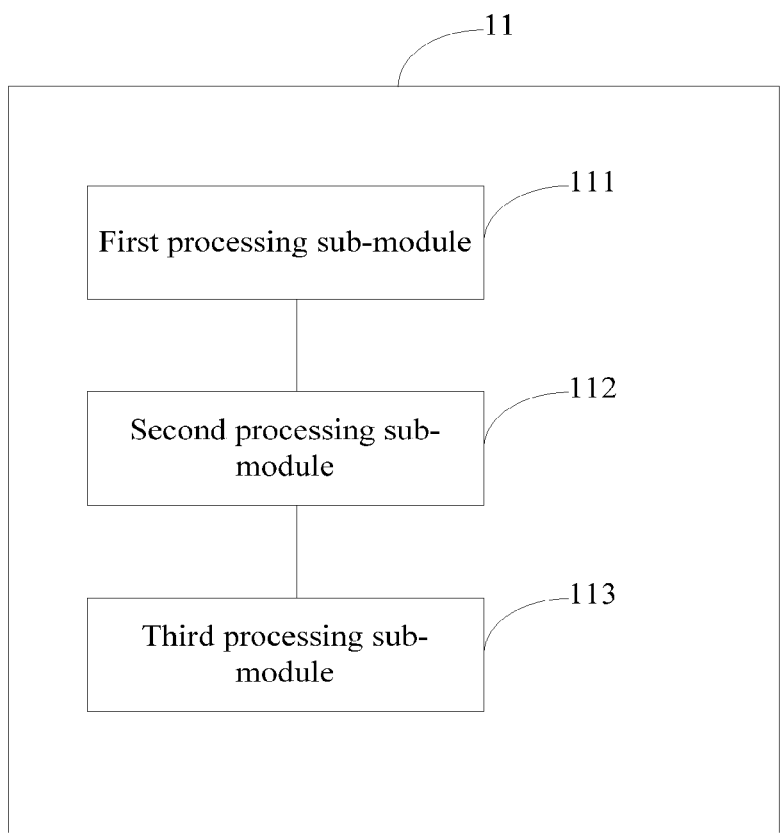
FIG. 9 is a block diagram of fourth aspect of a terminal device according to an exemplary aspect of the present disclosure.

FIG. 9 is a block diagram of fourth aspect of a terminal device according to an exemplary aspect. As shown in FIG. 9, on the basis of the foregoing aspect shown in any one of FIG. 6 to FIG. 8, the first processing module 11 includes:

a first processing sub-module 111, configured to switch the CC pin of the terminal device connected to a first resistor of the C interface of the cable to the ADC module in the terminal device by a preset frequency;

a second processing sub-module 112, configured to, when the CC pin is connected to the ADC module, trigger the ADC module to acquire the first voltage value provided via the cable through a second resistor of the terminal device; and a third processing sub-module 113, configured to determine whether the cable is the standard cable or not according to the first voltage value.

Optionally, the third processing sub-module 113 is specifically configured to:

when it is determined that the first voltage value exceeds the preset voltage threshold, increase the number of times that the first voltage value exceeds the preset voltage threshold by one; and when the accumulated number of times that the detected first voltage value exceeds the preset voltage threshold is greater than or equal to the preset number of times, determine that the cable is a non-standard cable.

Optionally, the third processing sub-module 113 is further configured to:

when the accumulated number of times that the detected first voltage value exceeds the preset voltage threshold is less than the preset number of times, determine that the cable is the standard cable.

Figure 10:
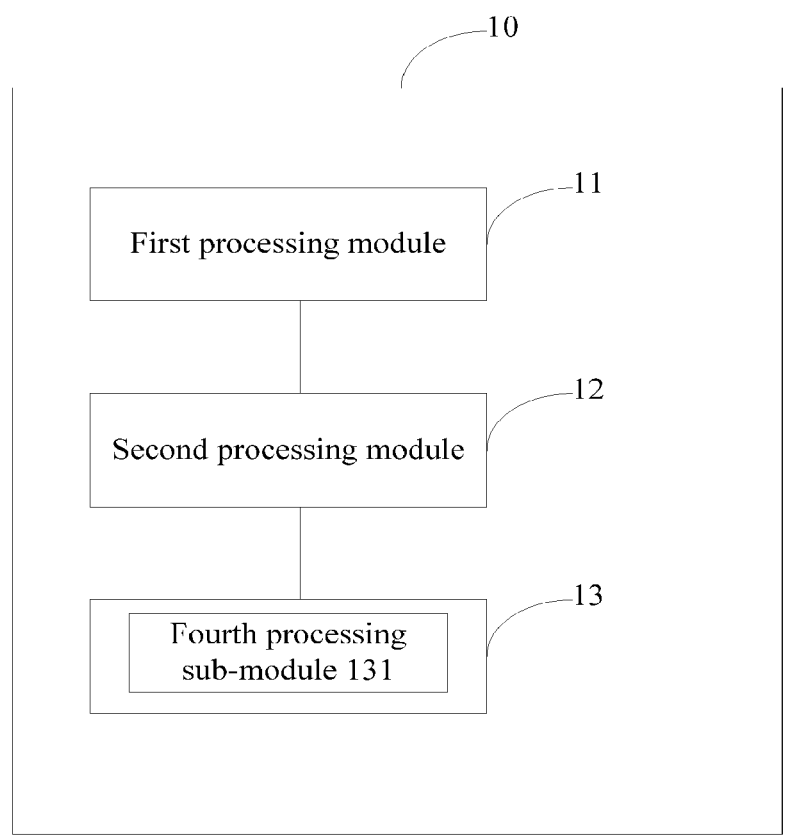
FIG. 10 is a block diagram of fifth aspect of a terminal device according to an exemplary aspect of the present disclosure.

FIG. 10 is a block diagram of fifth aspect of a terminal device according to an exemplary aspect. As shown in FIG. 10, on the basis of the foregoing aspects, the third processing module 13 includes:

a fourth processing sub-module 131, configured to adopt the quickly-charging protocol to control the charging device to boost the voltage output by the charging device via the cable, to charge the terminal device by adopting the quickly-charging input voltage.

Figure 11:
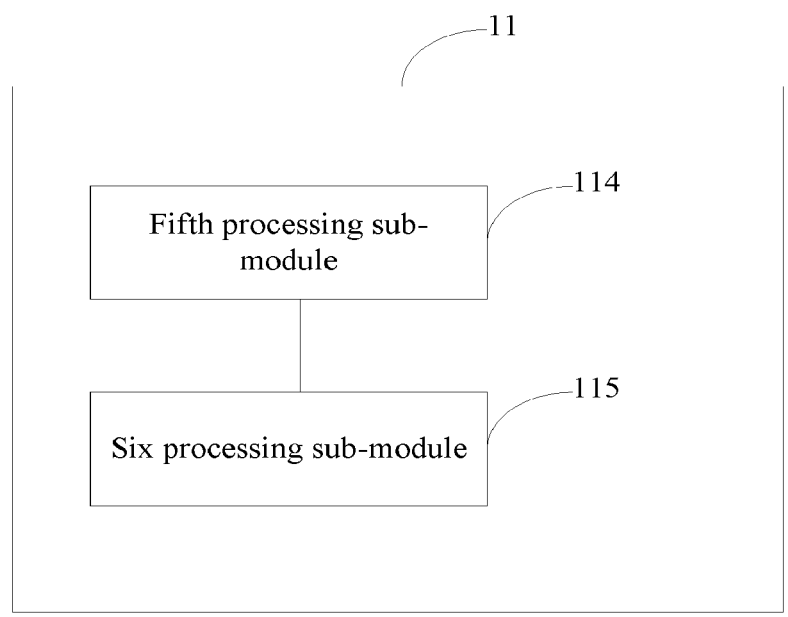
FIG. 11 is a block diagram of sixth aspect of a terminal device according to an exemplary aspect of the present disclosure.

FIG. 11 is a block diagram of sixth aspect of a terminal device according to an exemplary aspect. As shown in FIG. 11, on the basis of the foregoing aspects, the first processing module 11 further includes:

a fifth processing sub-module 114, configured to, if it is determined that the CC pin is pulled down to the first resistor, determine that the terminal device is in the UFP mode; and optionally, a sixth processing sub-module 115 is configured to, if it is determined that the CC pin is pulled up to the current source, determine that the terminal device is in the downstream facing port (DFP) mode.

With regard to the terminal device in the above aspects, the specific manner, in which each of the modules performs operation, has been described in detail in the aspects of the related methods, and will not be described in detail here.

Figure 12:
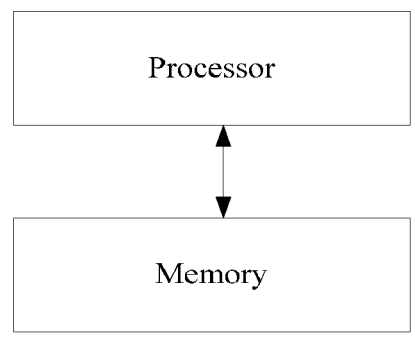
FIG. 12 is a block diagram of an entity of a terminal device according to an exemplary aspect of the present disclosure.

FIG. 12 is a block diagram of an entity of a terminal device according to an exemplary aspect. Referring to FIG. 12, the terminal device may be specifically implemented as: a processor and a memory configured to store processor-executable instructions, wherein the processor is configured to:

when determining that the terminal device is in the upstream facing port (UFP) mode, detect whether the cable connected to the terminal device is the standard cable or not, wherein the terminal device is connected to a charging device via the cable; and if the cable is not the standard cable, control, via the cable, the charging device to provide the standard voltage of non-quickly-charging input voltage to charge the terminal device.

In the above aspects, it should be understood that the processor may be a central processing unit (CPU), and may be other general purpose processor, digital signal processor (DSP), application specific integrated circuit (ASIC), and the like. The general purpose processor may be a microprocessor or the processor may be any conventional processor or the like, and the memory mentioned above may be a read only memory (ROM), a random access memory (RAM), a flash memory, a hard disk or a solid state hard disk. The steps of the method disclosed in combination with the aspects of the present disclosure may be directly embodied as implementation of a hardware processor, or a combination of hardware and software modules in the processor.

With regard to the terminal device in the above aspects, the specific manner, in which each of the modules performs operation, has been described in detail in the aspects of the related methods and devices, and will not be described in detail here.

Figure 13:
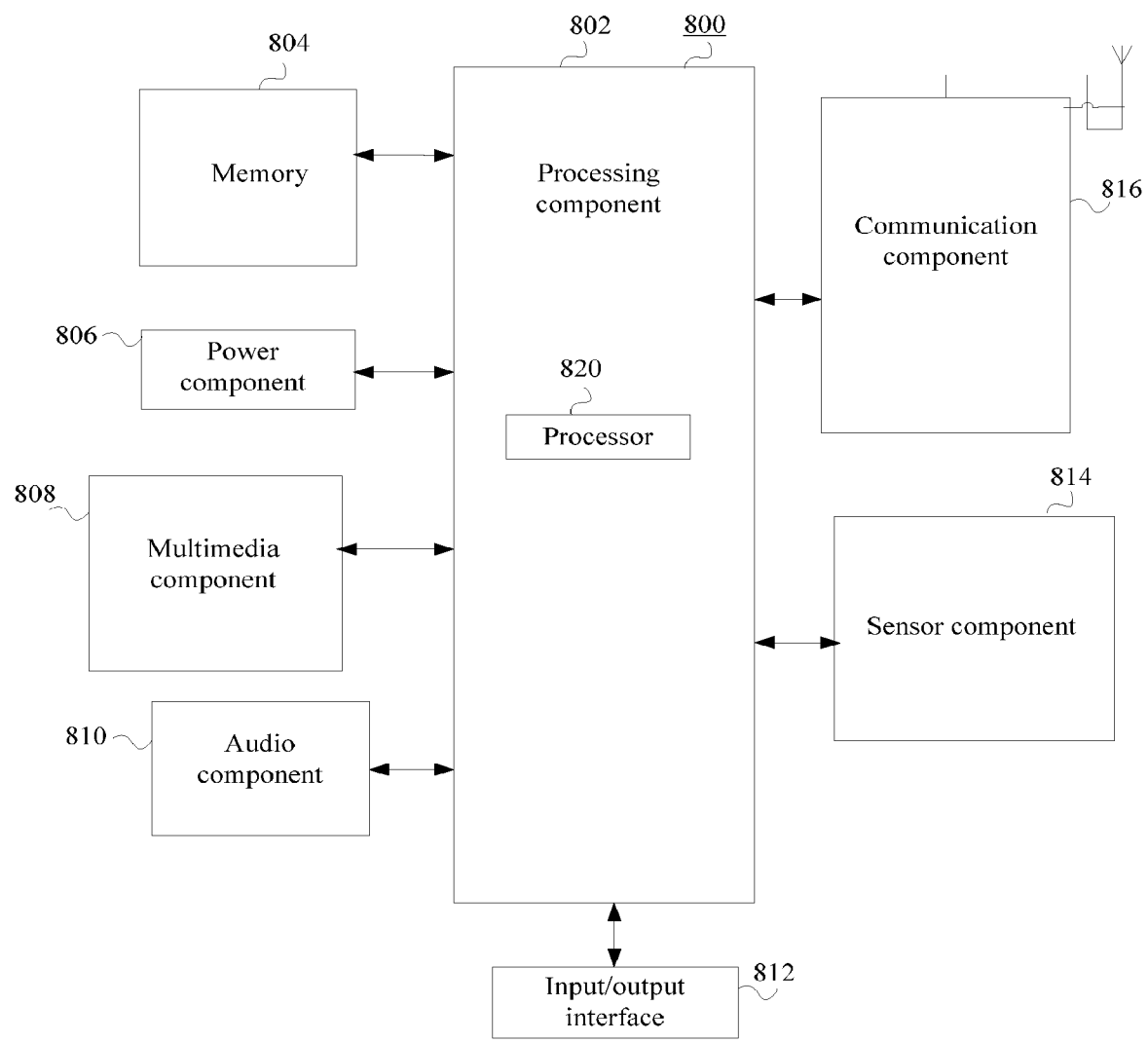
FIG. 13 is a block diagram of a terminal device 800 according to an exemplary aspect of the present disclosure.

FIG. 13 is a block diagram of a terminal device 800 according to an exemplary aspect. For example, the terminal device 800 may be a mobile phone, a computer, a digital broadcast terminal, a messaging device, a game console, a tablet device, a medical device, a fitness device, a personal digital assistant, and the like.

Referring to FIG. 13, the terminal device 800 may include one or more of following components: a processing component 802, a memory 804, a power component 806, a multimedia component 808, an audio component 810, an input/output (I/O) interface 812, a sensor component 814 and a communication component 816.

The processing component 802 typically controls the overall operation of the terminal device 800, such as operation associated with display, telephone calls, data communications, camera operation and recording operation. The processing component 802 may include one or more processors 820 to execute instructions to perform all or part of the steps of the methods described above. Moreover, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the terminal device 800. Examples of such data include instructions of any application or method operated on the terminal device 800, contact data, phone book data, messages, pictures, videos, and the like. The memory 804 may be implemented by any type of volatile or non-volatile storage devices, or a combination thereof, which may be such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the terminal device 800. The power component 806 may include a power management system, one or more power sources, and other components associated with generating, managing, and distributing power for the terminal device 800.

The multimedia component 808 includes a screen that provides an output interface between the terminal device 800 and a user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may not only sense the boundary of the touch or sliding action, but also detect the duration and pressure associated with the touch or slide operation. In some aspects, the multimedia component 808 includes a front camera and/or a rear camera. When the terminal device 800 is in an operation mode, such as a shooting mode or a video mode, the front camera and/or the rear camera may receive external multimedia data. Each front camera and each rear camera may be a fixed optical lens system or have focal length and optical zoom capability.

The audio component 810 is configured to output and/or input audio signals. For example, the audio component 810 includes a microphone (MIC), and when the terminal device 800 is in an operational mode, such as a call mode, a recording mode, or a voice recognition mode, the microphone is configured to receive external audio signals. The received audio signal may be further stored in the memory 804 or sent through the communication component 816. In some aspects, the audio component 810 further includes a speaker for outputting audio signals.

The I/O interface 812 provides an interface between the processing component 802 and a peripheral interface module which may be a keyboard, a click wheel, a button, and the like. These buttons may include, but are not limited to, a home button, a volume button, a start button and a lock button.

The sensor assembly 814 includes one or more sensors for providing a status assessment of various aspects for the terminal device 800. For example, the sensor component 814 may detect an open/closed state of the terminal device 800, a relative positioning of components, such as the display and keypad of the terminal device 800, the sensor component 814 may further detect a position change of the terminal device 800 or one component of the terminal device 800, the presence or absence of contact of the user with the terminal device 800, azimuth or acceleration/deceleration of the terminal device 800, and temperature changes of the terminal device 800. The sensor component 814 may include a proximity sensor, configured to detect the presence of nearby objects without any physical contact. The sensor component 814 may further include a light sensor, such as a CMOS or CCD image sensor, for use in imaging applications. In some aspects, the sensor component 814 may further include an acceleration sensor, a gyro sensor, a magnetic sensor, a pressure sensor, or a temperature sensor.

The communication component 816 is configured to facilitate wired or wireless communication between the terminal device 800 and other devices. The terminal device 800 may access a wireless network based on a communication standard such as WiFi, 2G or 3G, or a combination thereof. In an exemplary aspect, the communication component 816 receives broadcast signals or information about broadcast from an external broadcast management system through a broadcast channel. In an exemplary aspect, the communication component 816 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology and other technologies.

In an exemplary aspect, the terminal device 800 may be implemented by one or more application specific integrated circuits (ASICs), digital signal processors (DSP), digital signal processing devices (DSPD), programmable logic devices (PLD), field programmable gate arrays (FPGA), controllers, microcontrollers, microprocessors, or other electronic components, for performing the methods described above.

In an exemplary aspect, there is further provided a non-transitory computer readable storage medium including instructions, such as the memory 804 including instructions, the instructions may be executed by the processor 820 of the terminal device 800 to perform the above method. For example, the non-transitory computer readable storage medium may be a ROM, a random access memory (RAM), a CD-ROM, a magnetic tape, a floppy disk, an optical data storage device, and the like.

A non-transitory computer readable storage medium, when the instructions in the storage medium are executed by the processor of the terminal, enable the terminal device 800 to perform the charging processing method provided by any of the foregoing aspects, and the method includes:

when determining that a terminal device is in the upstream facing port (UFP) mode, detecting whether the cable connected to the terminal device is the standard cable or not, wherein the terminal device is connected to a charging device via the cable; and if the cable is not the standard cable, controlling, via the cable, the charging device to provide the standard voltage of non-quickly-charging input voltage to charge the terminal device.

The aspects of the present disclosure further provide a computer storage medium having computer program stored thereon, wherein, when being executed by a processor, the computer program implements the charging processing method provided by any of the foregoing aspects.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and various modifications and changes can be made without departing from the scope thereof. It is intended that the scope of the disclosure only be limited by the appended claims.

What is claimed is:

1. A charging processing method, applied to a terminal device, comprising:
    determining whether the terminal device is in a upstream-facing port (UFP) mode;
    when the terminal device is in the UFP mode, determining whether a cable is connected to the terminal device;
    when the cable is connected to the terminal device, determining whether the cable is a standard cable or a non-standard cable, wherein the terminal device is connected to a charging device via the cable; and
    when the cable is the non-standard cable, controlling, via the cable, the charging device to provide a standard voltage of non-quickly-charging input voltage to charge the terminal device,
    wherein determining whether the cable connected to the terminal device is the standard cable or the non-standard cable comprises:
    switching a CC pin of the terminal device connected to a first resistor of a C interface of the cable to an ADC module in the terminal device by a preset frequency;
    when the CC pin is connected to the ADC module, triggering the ADC module to acquire a first voltage value provided via the cable through a second resistor of the terminal device; and
    determining whether the cable is the standard cable or the non-standard cable based on first voltage value.

2. The method according to claim 1, further comprising:
    when the cable is the standard cable, controlling, via the cable, the charging device to provide a quickly-charging input voltage to charge the terminal device.

3. The method according to claim 1, further comprising:
    when the cable is the non-standard cable, displaying an alert message that is configured to indicate that the cable is the non-standard cable.

4. The method according to claim 1, wherein determining whether the cable is the standard cable or the non-standard cable based on the first voltage value comprises:
    determining whether the first voltage value exceeds a preset voltage threshold;
    when the first voltage value exceeds the preset voltage threshold, increasing a number of times that the first voltage value exceeds the preset voltage threshold by one;
    determining an accumulated number of times that the first voltage value exceeds the preset voltage threshold; and
    when the accumulated number of times that the first voltage value exceeds the preset voltage threshold is greater than or equal to a preset number of times, determining that the cable is the non-standard cable.

5. The method according to claim 4, further comprising:
    when the accumulated number of times that the first voltage value exceeds the preset voltage threshold is less than the preset number of times, determining that the cable is the standard cable.

6. The method according to claim 2, wherein controlling, via the cable, the charging device to provide the quickly-charging input voltage to charge the terminal device comprises:
adopting a quickly-charging protocol to control the charging device to boost a voltage output by the charging device via the cable to charge the terminal device by adopting the quickly-charging input voltage.

7. The method according to claim 1, wherein determining whether the terminal device is in the UFP mode comprises:
determining whether a CC pin of the terminal device is pulled down to a first resistor of a C interface of the cable; and
when the CC pin of the terminal device is pulled down to the first resistor of the C interface of the cable, determining that the terminal device is in the UFP mode.

8. The method according to claim 7, further comprising:
determining whether the CC pin of the terminal device is pulled up to a current source of the terminal device; and
when the CC pin is pulled up to the current source of the terminal device, determining that the terminal device is in a downstream facing port (DFP) mode.

9. A terminal device, comprising:
a processor; and
a memory configured to store instructions executable by the processor,
wherein the processor is configured to:
determine whether the terminal device is in a upstream facing port (UFP) mode;
when the terminal device is in the UFP mode, determine whether a cable is connected to the terminal device;
when the cable is connected to the terminal device, determine whether the cable is a standard cable or a non-standard cable, wherein the terminal device is connected to a charging device via the cable; and
when the cable is the non-standard cable, control, via the cable, the charging device to provide a standard voltage of non-quickly-charging input voltage to charge the terminal device,
wherein, when determining whether the cable connected to the terminal device is the standard cable or the non-standard cable, the processor is further configured to:
switch a CC pin of the terminal device connected to a first resistor of a C interface of the cable to an ADC module in the terminal device by a preset frequency;
when the CC pin is connected to the ADC module, trigger the ADC module to acquire a first voltage value provided via the cable through a second resistor of the terminal device; and
determine whether the cable is the standard cable or the non-standard cable based on the first voltage value.

10. The terminal device according to claim 9, wherein the processor is further configured to:
when the cable is the standard cable, control, via the cable, the charging device to provide a quickly-charging input voltage to charge the terminal device.

11. The terminal device according to claim 9, wherein the processor is further configured to:
when the cable is the non-standard cable, display an alert message that is configured to indicate that the cable is the non-standard cable.

12. The terminal device according to claim 9, wherein, when determining whether the cable is the standard cable or the non-standard cable based on the first voltage value, the processor is further configured to:

determine whether the first voltage value exceeds a preset voltage threshold;
when the first voltage value exceeds the preset voltage threshold, increase a number of times that the first voltage value exceeds the preset voltage threshold by one;
determine an accumulated number of times that the first voltage value exceeds the preset voltage threshold; and
when the accumulated number of times that the first voltage value exceeds the preset voltage threshold is greater than or equal to a preset number of times, determine that the cable is the non-standard cable.

13. The terminal device according to claim 12, wherein the processor is further configured to:
when the accumulated number of times that the first voltage value exceeds the preset voltage threshold is less than the preset number of times, determine that the cable is the standard cable.

14. The terminal device according to claim 10, wherein, when controlling, via the cable, the charging device to provide the quickly-charging input voltage to charge the terminal device, the processor is further configured to:
adopt a quickly-charging protocol to control the charging device to boost a voltage output by the charging device via the cable, to charge the terminal device by adopting the quickly-charging input voltage.

15. The terminal device according to claim 9, wherein, when determining whether the terminal device is in the UFP mode, the processor is further configured to:
determine whether a CC pin of the terminal device is pulled down to a first resistor of a C interface of the cable; and
when the CC pin of the terminal device is pulled down to the first resistor of the C interface of the cable, determine that the terminal device is in the UFP mode.

16. The terminal device according to claim 15, wherein the processor is further configured to:
determining whether the CC pin of the terminal device is pulled up to a current source of the terminal device; and
when the CC pin is pulled up to the current source of the terminal device, determining that the terminal device is in a downstream facing port (DFP) mode.

17. A non-transitory computer-readable medium storing instructions that, when executed by one or more processors of a terminal device, cause the terminal device to:
determine whether the terminal device is in a upstream facing port (UFP) mode;
when the terminal device is in the UFP mode, determine whether a cable is connected to the terminal device;
when the cable is connected to the terminal device, determine whether the cable is a standard cable or a non-standard cable, wherein the terminal device is connected to a charging device via the cable; and
when the cable is the non-standard cable, control, via the cable, the charging device to provide a standard voltage of non-quickly-charging input voltage to charge the terminal device,
wherein, when determining whether the cable connected to the terminal device is the standard cable or the non-standard cable, cause the terminal device further to:
switch a CC pin of the terminal device connected to a first resistor of a C interface of the cable to an ADC module in the terminal device by a preset frequency;

when the CC pin is connected to the ADC module, trigger the ADC module to acquire a first voltage value provided via the cable through a second resistor of the terminal device; and determine whether the cable is the standard cable or the non-standard cable based on the first voltage value.

* * * * *